(12) United States Patent
Arbanas

(10) Patent No.: US 6,578,272 B2
(45) Date of Patent: Jun. 17, 2003

(54) EDGE CUTTING APPARATUS

(76) Inventor: Anthony C. Arbanas, 10679 Rio Hermoso, Delray Beach, FL (US) 33446

( * ) Notice: Subject to any disclaimer, the term of this patent is extended or adjusted under 35 U.S.C. 154(b) by 0 days.

(21) Appl. No.: 09/981,530

(22) Filed: Oct. 17, 2001

(65) Prior Publication Data

US 2003/0070302 A1 Apr. 17, 2003

(51) Int. Cl.[7] .............................. A01B 13/00
(52) U.S. Cl. ............................ 30/316; 30/301; 172/25
(58) Field of Search .................... 30/301, 300, 316; 122/13, 19, 111, 25

(56) References Cited

U.S. PATENT DOCUMENTS

| | | |
|---|---|---|
| 2,615,246 A | 10/1952 | Littig |
| 2,691,823 A | 10/1954 | Dombrowski |
| 2,764,926 A | 10/1956 | Heimbigner |
| 2,953,852 A | 9/1960 | Dehn |
| 3,062,299 A | 11/1962 | Koepfinger |
| 3,064,353 A | 11/1962 | Montgomery |
| 3,111,995 A * | 11/1963 | Dahl ............................ 30/316 |
| 3,127,939 A | 4/1964 | Rink |
| 3,143,176 A | 8/1964 | Drane |
| 3,555,680 A | 1/1971 | Ford |
| 3,565,179 A | 2/1971 | Palliani |
| 3,680,639 A | 8/1972 | Davis |
| 3,747,213 A | 7/1973 | Green et al. |
| 3,747,214 A | 7/1973 | Bohlman |
| 3,814,189 A | 6/1974 | Thompson |
| 3,905,103 A | 9/1975 | Ford et al. |
| 3,960,218 A | 6/1976 | Atchley et al. |
| D242,894 S | 1/1977 | Harris |
| 4,209,903 A | 7/1980 | Owens |
| 4,260,026 A | 4/1981 | Deckert |
| 4,547,966 A | 10/1985 | Eden |
| 4,659,127 A | 4/1987 | Hancovsky |
| D297,498 S | 9/1988 | Prince |
| 4,832,131 A | 5/1989 | Powell et al. |
| D306,247 S | 2/1990 | Shields |
| 5,242,024 A | 9/1993 | Van Houten |
| D342,651 S | 12/1993 | Manos |
| 5,461,788 A | 10/1995 | Taylor |
| 5,493,783 A | 2/1996 | Oostendorp |
| 5,938,290 A | 8/1999 | Mikeska |
| 6,038,774 A | 3/2000 | Boekeloo et al. |
| 6,047,651 A | 4/2000 | Wilson |
| D423,889 S | 5/2000 | Heffner |
| 6,134,789 A | 10/2000 | Strickland |

* cited by examiner

Primary Examiner—Douglas D. Watts
(74) Attorney, Agent, or Firm—Akerman Senterfitt

(57) ABSTRACT

An edge cutting apparatus provides a means for edging around pop-up and stationary sprinkler devices and provides a safe and secure means of transporting the components of the apparatus. An edge cutting apparatus can include a cutter handle with a compression collar integrated to a T-shaped cutter handle. The cutter handle having a first end and a second end. The cutter head assembly can be detachably coupled to at least one of the first end and second end of the cutter handle. The cutter head assembly can include a cutter head and a cutter blade having cutter blade teeth. An edge cutting apparatus carrying kit can include a cutter handle, the cutter handle having a T-shape with an compression collar integrated to the cutter handle, and a cutter head assembly comprising a cutter head and a cutter blade. The carrying kit further includes an upper plate having circular indentations to receive the cutter head, and a lower plate having circular indentations equipped to receive the cutter blade.

26 Claims, 4 Drawing Sheets

EDGE CUTTING APPARATUS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF INVENTION

1. Technical Field

The present invention relates generally to a sprinklers, in particular to a apparatus for trimming around a sprinkler.

2. Description of the Related Art

Sprinkler systems are widely used in public and private areas to irrigate and maintain one's lawn. Most sprinkler systems utilize incorporate the use of pop-up sprinklers. Pop-up sprinklers have cylindrical bodies which are embedded in the soil with an annular top even with the top soil of the lawn. During usage, the pop-up sprinkler rises above the surrounding lawn and delivers water to the lawn. A typical sprinkler system can contain several pop-up sprinklers positioned throughout the lawn. Pop-up sprinklers are convenient and provide the ability to deliver water to multiple areas of the lawn. However, cutting and trimming a lawn having pop-up sprinklers can be problematic. The area of the lawn directly surrounding a pop-up sprinkler grows thick due to the closeness to the water of the pop-up sprinkler. This particular area of the lawn can be difficult and laborious to trim. For example, when cutting a lawn with a lawnmower, an individual has to use separate tools and expend extra time and energy to manually trim the grass directly surrounding a pop-up sprinkler.

Several attempts have been made to develop an apparatus that can be utilized to trim around sprinklers. Specifically, in U.S. Pat. No. 6,134,789 to Strickland discloses an apparatus for cutting grass directly over the top of a pop-up sprinkle head's shaft. The apparatus disclosed in Strickland is utilized by connecting the apparatus to a power source, such as an electric drill or gas powered motor. Moreover, the apparatus disclosed in Strickland includes a universal adapter end that must be clamped down to a hand held drill or other device, such as a weed eater. While the Strickland apparatus can be an adequate solution for the basic purpose and function for which it had been specifically designed, the Strickland apparatus is deficient with respect to its failure to be utilized separately from an external power source or adapter, and does not provide the most convenient and efficient apparatus for trimming the surrounding grass around a pop-up sprinkler head. Other devices in the prior art are deficient in consequence of problems occurring during the usage of the device to trim grass from around the sprinkler heads. For instance, U.S. Pat. No. 5,242,024 to Van Houten discloses a device for the removal of circular plug members in surrounding relationship around sprinkler heads. The Van Houten device includes a is formed with a cylindrical body having a continuous serrated lower edge spaced from an annullar upper edge, with a handlebar mounted through the cylindrical body orthogonally relative to the axis adjacent the upper edge. Nevertheless, many devices, such as the device disclosed in Van Houten, are not suited to adequately trim around pop-up sprinklers while sprinklers are actively delivering water to the surrounding lawn. In consequence, many users of devices available in the prior art are compelled to turn off the corresponding sprinkler system to avoid being doused with water from the sprinkler or trim the surrounding grass utilizing other means, such as their hands or small shears.

Trimming or cutting the surrounding grass located directly around a sprinkler head should be simple and unproblematic; however, it is sometimes tedious due to the inadequacies in the devices available in the prior art. Whether it is a device that has multiple deficient components or poorly structured design features, the devices available in the prior art are not the most efficient or economical. Accordingly, there exists a need for an improved apparatus for cutting grass surrounding sprinkler heads thereby reducing the time required to edge around the particular sprinkler and further provides the ability to cut grass surrounding sprinkler heads while the sprinkler is situated in an on position and actively dispersing water, and also assists in finding the location of the sprinkler head.

SUMMARY OF INVENTION

The present invention relates to an edge cutting apparatus that provides a means of cutting the area of the lawn surrounding pop-up sprinklers and stationary sprinklers when the irrigation system is situated in an on or off position. The invention provides a means for cutting the area of the lawn surrounding a pop-up sprinkler while protecting the user from water being dispersed from the sprinkler. Additionally, the invention provides a means for safely and securely storing the attached cutter head assemblies and effectively transporting the components of the edge cutting apparatus.

The edge cutting apparatus makes it easy to perform lawn care services in the lawns having irrigation systems and sprinkler devices. The edge cutting apparatus provides the ability to remove grass from around sprinkler devices and other areas of the lawn that are normally difficult to reach due to its particular shape and location. The edge cutting apparatus provides a means of clearing foliage, dirt, pebbles, and other debris from around pop-up sprinkler heads can be extremely difficult.

An edge cutting apparatus can comprise a cutter handle having a compression collar integrated to a T-shaped cutter handle. The compression collar can provide support for the components of the edge cutting apparatus, such as a cutter head assembly when assembled to the cutter handle. The cutter handle having a first end and a second end. The cutter head assembly can be detachably coupled to at least one of the first end and second end of the handle member. The cutter head assembly can comprise a cutter head and a cutter blade having cutter blade teeth.

The cutter blade teeth can be easily sharpened and shaped using a hand held grinder or file. Sharpening and shaping the cutter blade teeth can provide more effective and efficient cutting of grass from around a sprinkler and other areas of one's lawn. Additionally, the ability to sharpen and shape the blade teeth also can extend the life of the edge cutting apparatus.

The present invention can include an edge cutting apparatus having a carrying kit. The carrying kit can include an upper plate, a lower plate, a cutter head assembly and a T-shaped cutter handle. The cutter handle having a T-shape with an integrated compression collar. The compression collar can provide support for the components of the edge cutting apparatus, such as the lower plate, the upper plate and the cutter head assembly. The carrying kit can be utilized to safely storage and transport the components of the edge cutting apparatus.

The edge cutting apparatus provides the ability to edge and maintain lawn care during periods when the sprinkler system is actively dispersing water. Unlike most conventional devices, the cutter head assembly of the edge cutting apparatus can be easily engaged around a variety of sprinklers having a wide range of sizes.

The carrying kit provides protection to the cutter head assemblies and also prevents the teeth of the cutter blade from being exposed, thus preventing accidents resulting from exposure of dangerously sharp blade teeth. Protecting the teeth of the cutter blade is extremely beneficial for users of the edge cutting apparatus having children or animals in close proximity of the home.

BRIEF DESCRIPTION OF THE DRAWINGS

The invention is pointed out with particularity in the appended claims. The above and further advantages of this invention may be better understood by referring to the following description taken in conjunction with the accompanying drawings, it being understood, however, that the invention is not limited to the precise arrangements and instrumentalities shown.

DETAILED DESCRIPTION

The present invention relates to an edge cutting apparatus. More particularly The present invention relates to an edge cutting apparatus that provides a means of cutting the area of the lawn surrounding pop-up sprinklers and stationary sprinklers when the irrigation system is situated in an on or off position. The invention provides a means for cutting the area of the lawn surrounding a pop-up sprinkler while protecting the user from water being dispersed from the sprinkler. Additionally, the invention provides a means for safely securing and storing the attached cutter head assembly and effectively transporting the components of the edge cutting apparatus. Although the illustrations provided herewith depict the present invention in specific embodiments, it is understood that the illustrations are intended to be for illustrative purposes only. Accordingly, it is understood that the invention can exist in several embodiments.

Figure 1:
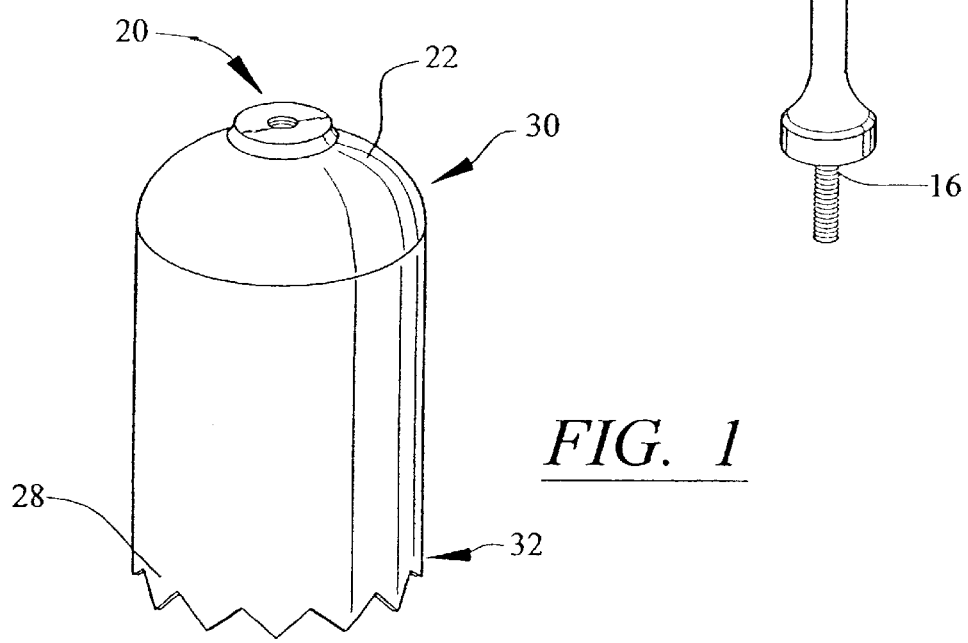
FIG. 1 Shows a perspective view of an edge cutting apparatus.

According to the invention as depicted in FIG. 1, an edge cutting apparatus 10 which has been configured in accordance with the inventive arrangements can comprise a cutter handle 12 with a compression collar 14 integrated to the cutter handle 12. The cutter handle 12 having a first end 16 and a second end 18. A cutter head assembly 20 can be detachably coupled to at least one of the first end 16 and second end 18 of the cutter handle 12. The cutter head assembly 20 can comprise a cutter head 22 and a cutter blade 28.

Figure 2:
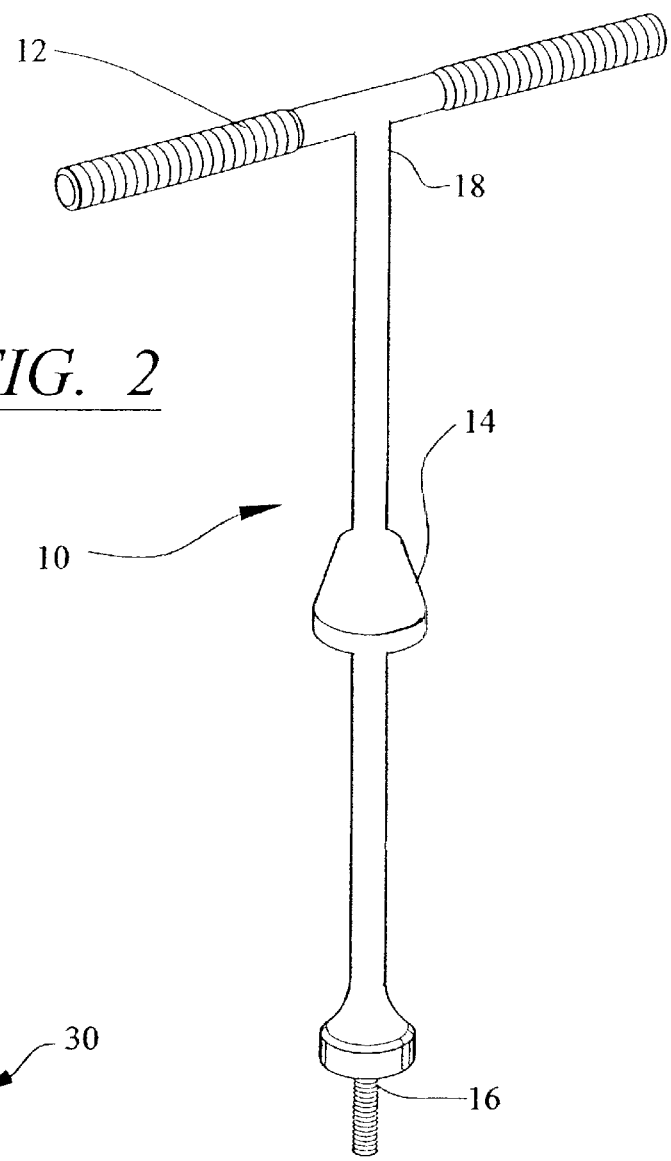
FIG. 2 Shows a perspective view of a T-shaped cutter handle having an integrated compression collar.

In one embodiment of the present invention, the cutter handle 12 can include a lateral member and a longitudinal member. The lateral member can be positioned at the end of the longitudinal member forming a T-shaped cutter handle as depicted in FIG. 2. The cutter handle 12 having a T-shape can be formed utilizing material, such as PVC, during the molding process. The T-shaped cutter handle 12 created from molding can have a solid structure providing further durability during usage. The T-shape allows the cutter handle 12 to be utilized to facilitate attachment to the cutter head assembly 20. The cutter handle 12 can include threads on at least one of the first end 16 and second end 18 of the cutter handle 12. In a cutter handle 12 having threads on the second end 18, the cutter handle 12 can be used to rotate the cutter handle 12 as the threads of the cutter handle 12 are received by the cutter head assembly 20. The threads of the cutter handle 12 provide the cutter handle 12 the ability to be easily attached and reattached to varying cutter head assemblies 20 of multiple sizes. The cutter handle 12 having a T-shape also allows the edge cutting apparatus 10 to be maneuvered during actual usage. For example, a cutter handle 12 having a T-shaped handle can be utilized to apply pressure to the area of grass directly beneath the edge cutting apparatus 10. Additionally, a cutter handle 12 having a T-shaped handle can be utilized to rotate the cutter handle 12 as the edge cutting apparatus 10 is engaged to an area of grass, thereby removing the grass from around the corresponding sprinkler. A rubber washer can be attached to the end of the cutter handle 12 having threads, which minimize the loosening of the cutter handle 12 to the attached cutter head 22 resulting from rotating the edge cutting apparatus 10 in a counter clock-wise direction.

Figure 3:
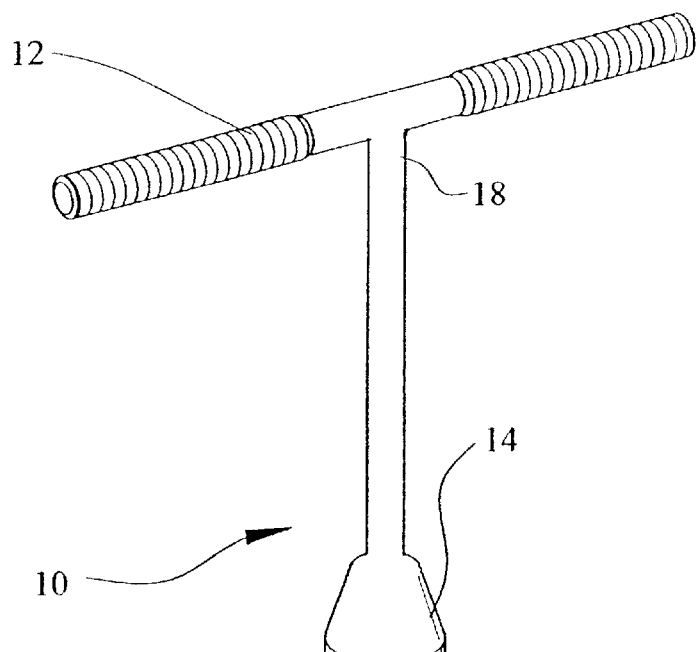
FIG. 3 Shows a perspective view of the cutter head assembly.

The edge cutting apparatus 10 can include a cutter handle 12 having at least one of the first end 16 and second end 18 of the cutter handle 12 attached to a cutter head assembly 20, as depicted in FIG. 3. The cutter handle 12 can be permanently or detachably coupled to the cutter head assembly 20. The cutter head assembly 20 can be comprised of a cutter head 22 and a cutter blade 28. The cutter head 22 can include a first end 24 and a second end 26. The cutter blade 28 can include a first end 30 and a second end 32. The cutter head 22 can be constructed having a cylindrical shape. The cutter head 22 can include a hollow inner diameter. For instance, the hollow inner diameter of the cutter head 22 can include a diameter of two inches in depth, allowing for maximum acceptance of the area underlying the cutter blade 28. The cutter head 22 can be provided in a multitude of sizes. The cutter head 22 can range from sizes of two and a half inches to eight inches. The flexibility in the size of the cutter head 22 allows the user the ability to select the appropriate size dependent on the size of the corresponding sprinkler or particular area of grass to be removed. The first end 24 of the cutter head 22 can include an opening 58 suited to receive the cutter handle 12. The opening 58 of the cutter head 22 can be utilized to facilitate the connection of the cutter handle 12 to the cutter head 22. The second end 26 of the cutter head 22 is attached to the first end 30 of the cutter blade 28 . In one embodiment of the present invention, the cutter blade 28 provides a cylindrical body with a hollowed inner diameter. The cutter blade 28 of the cutter head assembly 20 can be manufactured from sixteen (16) gauge tubular steel and constructed to have a total length of seven inches after attachment to the cutter head 22. After the cutter head 22 is attached to the cutter blade 28, the cutter head assembly 20 is capable of accepting up to nine inches in height and eight inches in circumference of a pop-up or stationary sprinkler. The hollowed inner diameter and the extensive length of the cutter blade 28 provide the cutter head assembly 20 with the ability to fit over a pop-up sprinkler or a stationary sprinkler while in operation without any associated difficulty. For example, utilizing the cutter head assembly 20, an individual is provided the ability to edge and maintain his lawn during periods when the sprinkler system is actively dispersing water. Unlike most conventional devices, the cutter head assembly 20 of the edge cutting apparatus 10 can be easily engaged around a variety of sprinklers. Some sprinkler heads can be diminutive, and due to its small size remain covered by grass and other lawn fixtures. Finding the exact location of the diminutive sprinkler heads can be an arduous task to accomplish when edging a lawn. Therefore, edging a lawn while the sprinkler is situated in an on position and actively dispersing water assists in finding the location of the sprinkler head, and reduces the time required to edge around the particular sprinkler. The large cylindrical cutter head 22 and cutter blade 28 provide the cutter head assembly 20 with a firm, water proof seal. The seal prevents any water from being released from underneath the cutter blade 28 while the cutter head assembly 20 is engaged over a sprinkler. Thus, during engagement, the user of the edge cutting apparatus 10 is protected from any water that may be dispersed by the sprinkler and can successfully remove any grass surrounding the sprinkler with the edge cutting apparatus 10. Using the present invention makes it more time efficient to perform the edging from around sprinklers located in large areas. The user does not have to turn off the existing irrigation or sprinkler system, which can become very burdensome. The depth of the cutter head assemblies 20 allows the user of the edge cutting apparatus 10 to simply engage the cutter blade 28 over the sprinkler and edge around the sprinkler with minimal effort and ease.

The second end 32 of the cutter blade 28 can include cutter blade teeth 34. The cutter blade teeth 34 can include half inch triangular teeth 34 which allow an increase and maximization of the cutting surface. The cutter blade teeth 34 can be easily sharpened and shaped using a hand held grinder or file. Sharpening and shaping the cutter blade teeth 34 can provide more effective and efficient cutting of grass from around a sprinkler and other areas of one's lawn. Additionally, the ability to sharpen and shape the cutter blade teeth 34 also can extend the life of the edge cutting apparatus 10.

Figure 4:
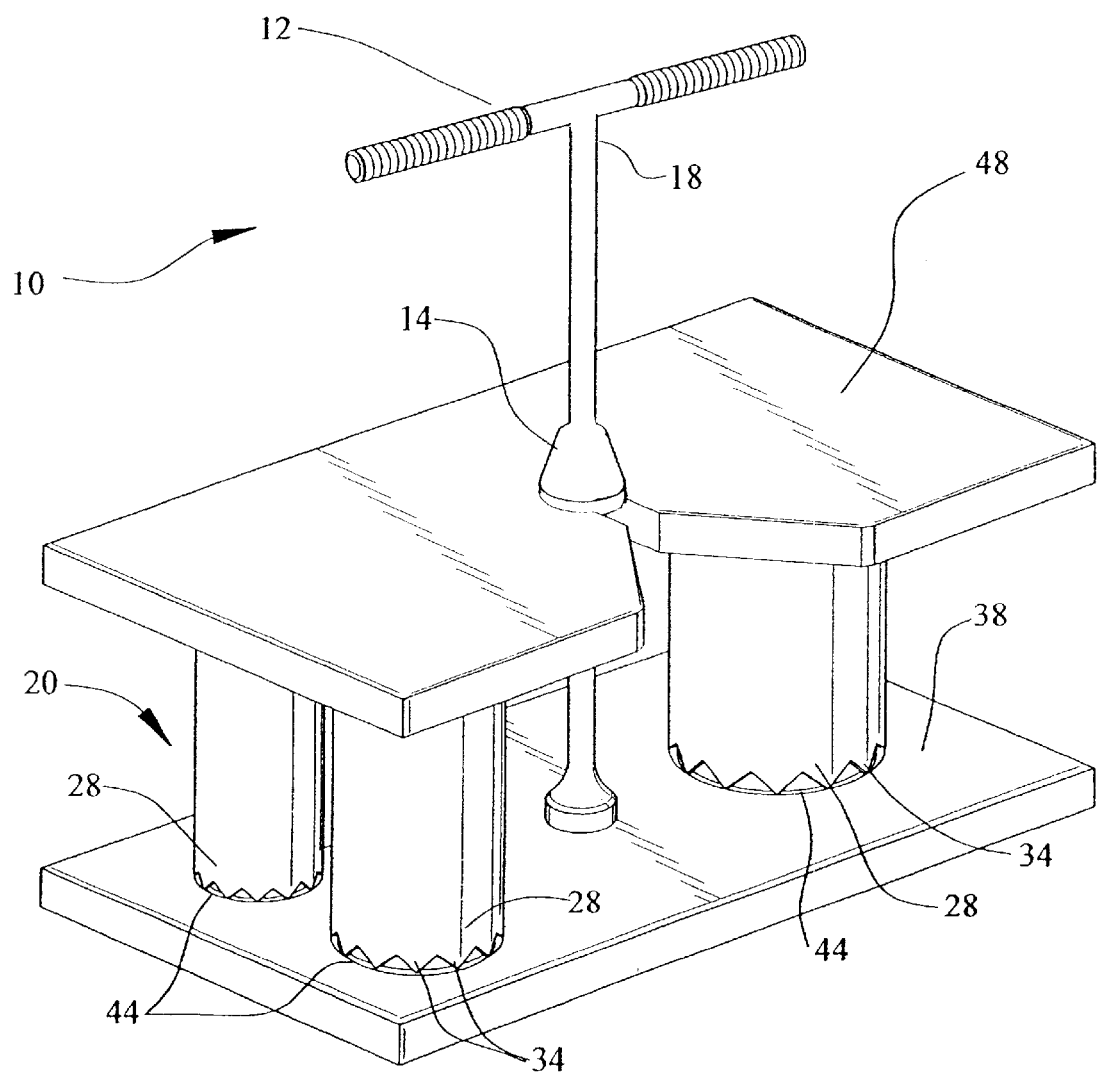
FIG. 4 Shows a perspective view of a carrying kit of an edge cutting apparatus.

The present invention can include an edge cutting apparatus 10 having a carrying kit 36, as illustrated in FIG. 4. The carrying kit 36 can include an upper plate 48, a lower plate 38, a cutter head assembly 20 and a cutter handle 12. The cutter handle 12 having a T-shape with an integrated compression collar 14. The carrying kit 36 can be utilized to safely store and transport the components of the edge cutting apparatus 10. The carrying kit 36 can include a plurality of cutter head assemblies 20. The structure and design of the carrying kit 36 is constructed to provide compression to the cutter head assemblies 20 placed between the upper plate 48 and the lower plate 38 of the edge cutting apparatus 10. The carrying kit 36 provides protection to the cutter head assemblies 20 and also prevents the cutter blade teeth 34 from being exposed, thus preventing accidents resulting from exposure of dangerously sharp cutter blade teeth 34. Protecting the cutter blade teeth 34 is extremely beneficial for users of the edge cutting apparatus 10 having children or animals in close proximity of the home. Additionally, the upper plate 48 and lower plate 38 allow the cutter head assemblies 20 to be stored safely in the carrying kit 36. In one embodiment of the present invention as shown in FIG. 4, three cutter head assemblies 20 can be safely stored in the carrying kit 36.

Figure 5:
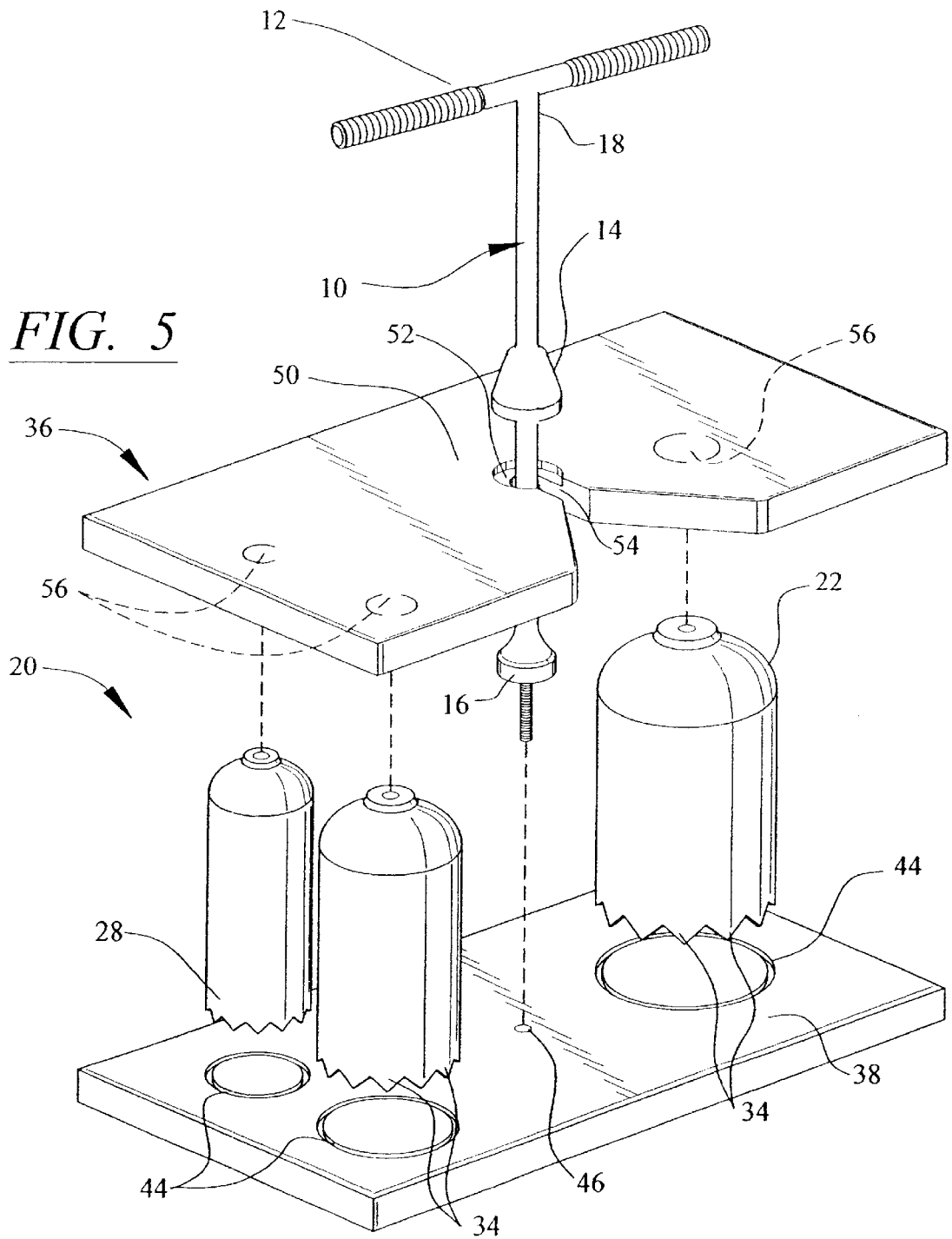
FIG. 5 Shows a perspective view of a lower plate and an upper plate of a carrying kit of an edge cutting apparatus.

In one embodiment of the present invention depicted in FIG. 5, the lower plate 38 of the carrying kit 36 can include a first surface 40 and a second surface 42. At least one of the first surface 40 and the second surface 42 can include circular indentations 44 equipped to receive the cutter blade 28 and cutter blade teeth 34. The circular indentations include a diameter corresponding to the diameter of the corresponding cutter blade 28 of the edge cutting apparatus 10. For example, in a edge cutting apparatus 10 providing three cutter blades 28 having a diameter of two and a half inches, three and a half inches and five and a half inches, the lower plate 38 can feature indentations of two and a half inches, three and a half inches and five and a half inches to receive the cutter blades 28. The depth of the indentations can vary in order to provide adequate protection for the corresponding cutter blade teeth 34. The indentations protect the cutter blade teeth 34 and prevent the cutter blade teeth 34 from accidental breakage. The indentations also prevent exposure of the cutter blade teeth 34. Additionally, at least one of the first surface 40 and the second surface 42 of the lower plate 38 can include an opening 46 suited to receive the male threads of the cutter handle 12. The opening 46 of the lower plate 38 can be utilized to facilitate the connection of the cutter handle 12 to the lower plate 38. The opening 46 can include female threads to receive the male threads located on at least the first end 16 and second end 18 of the cutter handle 12. The threads allow the cutter handle 12 to be screwed into the lower plate 38 to provide a secure connection between the cutter handle 12 and the lower plate 38 when the edge cutting apparatus 10 is assembled into a carrying kit 36.

The upper plate 48 of the carrying kit 36 includes a first surface 50 and a second surface 52. In one embodiment, the first surface 50 of the upper plate 48 include an opening 54 equipped to receive the integrated cutter handle compression collar 14. The second surface 52 can include a plurality of circular indentations 56 equipped to receive the first end 24 of the cutter head 22 located on the corresponding cutter head assembly 20. The second surface 52 of the upper plate 48 can be engaged to the first end 24 of the cutter head 22. For instance, a carrying kit 36 having three cutter head assemblies 20 can include an upper plate 48 having three corresponding circular indentations 56 suited to receive the cutter heads 22 of the three cutter head assemblies 20.

A compression collar 14 is integrated to the cutter handle 12. The compression collar 14 can provide support for the components of the edge cutting apparatus 10, such as the lower plate 38, the upper plate 48 and the cutter head assembly 20. The integrated cutter handle compression collar 14 provides pressure to the upper plate 48 of the carrying kit 36 to assist in keeping the components firmly bundled after the assembly of the carrying kit 36. In one embodiment of the present invention, the lower plate 38 can receive at least three cutter head assemblies 20. The cutter head assemblies 20 are placed onto the lower plate 38 and received by the corresponding indentations 44 of the lower plate 38. The upper plate 48 is placed directly above the cutter head assemblies 20 and the indentations 56 of the upper plate 48 can receive the cutter heads 22 of the corresponding cutter head assemblies 20. After the upper plate 48 has been properly attached, the cutter handle 12 is inserted through the opening 54 of the upper plate 48 and the opening 46 of the lower plate 38. The opening 54 in the upper plate 48 is engaged with the integrated cutter handle compression collar 14 of the cutter handle 12, as the cutter handle 12 is received by the opening 46 in the lower plate 38. Using the cutter handle 12 having threads on the end of the cutter handle 12, the cutter handle 12 can be rotated into the female threads of the lower plate opening 46 until the compression collar 14 is firmly engaged to the upper plate 48. When the edge cutting apparatus 10 is completely assembled, the compression collar 14 maintains a steady level of pressure against the upper plate 48 and assists in securely storing the corresponding cutter head assemblies 20. The compression collar 14 is molded into the cutter handle 12 providing the cutter handle 12 with a sturdy and secure surface when it is engaged with the upper plate 48. The T-shaped cutter handle 12 is designed to allow the cutter handle 12 to be used as a handle when attached to the individual cutter heads 22 of each cutter head assembly 20, and the compression collar 14 of the cutter handle 12 allows the cutter handle 12 to be securely assembled into a carrying kit 36. The carrying kit 36 permits the components of the edge cutting apparatus 10 to be safely stored and transported during actual use as a carrying kit 36 and minimizes associated risk resulting from exposed cutter blade teeth 34. The carrying kit 36 also reduces the frequency of misplaced components of the edge cutting apparatus 10, such as cutter head assemblies 20 and the cutter handle 12, by providing for the effective storage of the components.

It will of course be understood that the invention is not limited to the specific details described herein, which are given by way of example only, and that various modifications and alterations are possible within the scope of the invention as defined therein. Those skilled in the art may make modifications that include variations in size, materials, shape, form, function and manner of operation, without departing from the principles and concepts set forth herein.

What is claimed is:

1. An edge cutting apparatus comprising:
   a cutter handle having a first end and a second end opposite said first end; said cutter handle having a T-shape with a compression collar integrated to said cutter handle;
   a cutter head assembly comprising a first open end and a second closed end generally opposite from said first open end; wherein said second closed end of cutter head assembly is detachably coupled to said cutter handle; and
   said cutter head assembly comprising a cutter head and a cutter blade.

2. The edge cutting apparatus of claim 1, wherein said cutter head includes a first end and a second end.

3. The edge cutting apparatus of claim 1, wherein said cutter blade includes a first end and a second end.

4. The edge cutting apparatus of claim 1, wherein said cutter head is constructed having a cylindrical shape.

5. The edge cutting apparatus of claim 1, wherein said cutter head includes a hollow inner diameter.

6. The edge cutting apparatus of claim 1, wherein said second end of said cutter head is attached to said first end of said cutter blade.

7. The edge cutting apparatus of claim 1, wherein said cutter blade further comprises a plurality of cutter blade teeth.

8. The edge cutting apparatus of claim 7, wherein said cutter blade teeth are constructed from sixteen gauge tubular steel.

9. The edge cutting apparatus of claim 7, wherein said cutter blade teeth comprise a triangular shape having a length of one and a half inches.

10. The edge cutting apparatus of claim 1, wherein said cutter handle is engaged to said cutter head assembly, said cutter handle providing an axis of rotation for said cutter head assembly.

11. The edge cutting apparatus of claim 1, wherein said cutter head assembly provides a cutting means to remove lawn and debris surrounding at least one of a pop-up sprinkler head and a stationary sprinkler head.

12. The edge cutting apparatus of claim 1, wherein at least one of said first end and said second end of said cutter handle includes threads.

13. The edge cutting apparatus of claim 12, wherein said cutter head includes an opening having threads equipped to receive said threads of said cutter handle.

14. The edge cutting apparatus of claim 1, wherein said edge cutting apparatus includes a plurality of cutter head assemblies.

15. The edge cutting apparatus of claim 1, further comprising a rubber washer attached to said cutter handle, said rubber washer minimizing counter-clockwise friction during engagement of said edge cutting apparatus.

16. An edge cutting apparatus carrying kit comprising:
    a cutter handle having a first end and a second end opposite said first end; said cutter handle having a T-shape with an compression collar integrated to said cutter handle
    a cutter head assembly comprising a cutter head and a cutter blade;
    an upper plate having circular indentations to receive said cutter head; and
    a lower plate having circular indentations to receive said cutter blade.

17. The edge cutting apparatus carrying kit of claim 16, wherein said compression collar is engaged to said upper plate, said compression collar providing pressure to said cutter head assembly positioned between said upper plate and said lower plate.

18. The edge cutting apparatus carrying kit of claim 16, wherein said lower plate includes a first surface and a second surface.

19. The edge cutting apparatus carrying kit of claim 18, wherein at least one of said first surface and said second surface of said lower plate includes a plurality of circular indentations to receive said cutter blade teeth.

20. The edge cutting apparatus carrying kit of claim 18, wherein at least one of said first surface and said second surface of said lower plate includes an opening to receive said cutter handle.

21. The edge cutting apparatus carrying kit of claim 16, wherein said upper plate includes a first surface and a second surface.

22. The edge cutting apparatus carrying kit of claim 21, wherein said first surface of said upper plate includes an opening to receive said cutter handle compression collar of said cutter handle.

23. The edge cutting apparatus carrying kit of claim 21, wherein said second surface of said upper plate includes a plurality of circular indentations to receive said cutter head.

24. The edge cutting apparatus carrying kit of claim 16, wherein said cutter blade includes cutter blade teeth.

25. The edge cutting apparatus carrying kit of claim 24, wherein said cutter blade teeth are received by said plurality of circular indentations of said lower plate.

26. The edge cutting apparatus carrying kit of claim 16, wherein a plurality of cutter head assemblies are engaged between said lower plate and said upper plate during transporting of said edge cutting apparatus carrying kit.

* * * * *

UNITED STATES PATENT AND TRADEMARK OFFICE
CERTIFICATE OF CORRECTION

PATENT NO. : 6,578,272 B2　　　　　　　　　　　　　　　　　　　　　　　Page 1 of 1
DATED : June 17, 2003
INVENTOR(S) : Arbanas, Anthony C.

It is certified that error appears in the above-identified patent and that said Letters Patent is hereby corrected as shown below:

<u>Title page,</u>
Item [57], ABSTRACT,
Line 12, replace "an" with -- a --.

<u>Column 1,</u>
Line 15, replace "sprinklers" with -- sprinkler --.
Line 16, replace "a" with -- an --.
Line 20, replace "utilize" with -- utilized --.
Line 40, replace "sprinkle" with -- sprinkler --.
Line 59, replace "a" with -- and --.

<u>Column 2,</u>
Line 41, insert -- that -- after "heads".
Line 42, insert -- to remove -- after "difficult".

<u>Column 3,</u>
Line 40, replace "The" with -- the --.
Line 34, replace "allow" with -- allows --.

<u>Column 6,</u>
Line 7, replace "a" with -- an --.

Signed and Sealed this

Eighteenth Day of January, 2005

JON W. DUDAS
*Director of the United States Patent and Trademark Office*